United States Patent
Pullan

(10) Patent No.: US 9,922,455 B2
(45) Date of Patent: Mar. 20, 2018

(54) ROOM PLANNING SYSTEM AND METHOD

(71) Applicant: The West Retail Group Limited, York, East Yorkshire (GB)

(72) Inventor: Mark Pullan, York (GB)

(73) Assignee: The West Retail Group Limited, Hotham, York, East Yorkshire (GB)

( * ) Notice: Subject to any disclaimer, the term of this patent is extended or adjusted under 35 U.S.C. 154(b) by 0 days.

(21) Appl. No.: 14/906,775

(22) PCT Filed: Jul. 23, 2014

(86) PCT No.: PCT/GB2014/052248
§ 371 (c)(1),
(2) Date: Jan. 21, 2016

(87) PCT Pub. No.: WO2015/011472
PCT Pub. Date: Jan. 29, 2015

(65) Prior Publication Data
US 2016/0196689 A1    Jul. 7, 2016

(30) Foreign Application Priority Data
Jul. 23, 2013  (GB) .................................. 1313112.3

(51) Int. Cl.
*G06T 15/00* (2011.01)
*G06T 17/10* (2006.01)
(Continued)

(52) U.S. Cl.
CPC .......... *G06T 17/10* (2013.01); *G06F 3/04815* (2013.01); *G06F 17/5004* (2013.01); *G06F 2217/04* (2013.01); *G06T 2200/24* (2013.01)

(58) Field of Classification Search
CPC ..... G06F 17/5004; G06T 17/00; G06T 17/05; G06T 17/10
See application file for complete search history.

(56) References Cited

U.S. PATENT DOCUMENTS

| | | | |
|---|---|---|---|
| 7,353,188 B2* | 4/2008 | Yim .................... | G06Q 30/0239 705/26.62 |
| 2009/0138113 A1* | 5/2009 | Hoguet ............... | G06F 17/5004 700/98 |

(Continued)

OTHER PUBLICATIONS

Search Report issued by the Intellectual Property Office dated Dec. 20, 2013 in GB Patent Application No. GB1313112.3 (7 sheets).

*Primary Examiner* — Charles Tseng
(74) *Attorney, Agent, or Firm* — Gesmer Updegrove LLP

(57) ABSTRACT

A room planning system, generally at 10, comprises a host site 12 and a local site 14, two-way communication between which is represented by arrows A. On the host site is a host processor 16, which is connected to a database 18. On the local site is a local processor 20 that is connected to user input apparatus, in the form of a keyboard 24 and mouse 26, and to a graphical user interface, in the form of a display 28. The database 18 contains data of a plurality of types of product that are available for the design of a room space. In the example of a kitchen room space, the database contains product details of items such as room fixtures, floor units, wall units, worktops, handles, cornices, plinths, pelmets, sinks, taps, appliances and accessories. The host processor 16 is in communication with one or more local processors 20 via a communications network represented by arrows A, which could be a wide area network, such as the Internet. The local processor 20, which may comprise a personal computer, has stored thereon a computer program for causing the processor 20 carry out a room space design method, and for displaying a design template, and an image of the design, on the display 28, as will be described below. A 3-D engine, located within the local processor 20, is able to create and display a virtual room space on the display 28.

16 Claims, 13 Drawing Sheets

(51) Int. Cl.
*G06F 17/50* (2006.01)
*G06F 3/0481* (2013.01)

(56) References Cited

U.S. PATENT DOCUMENTS

2009/0160856 A1* 6/2009 Hoguet .................. G06Q 10/06
345/420
2013/0335414 A1* 12/2013 Jovanovic ............. G06T 19/006
345/420

* cited by examiner

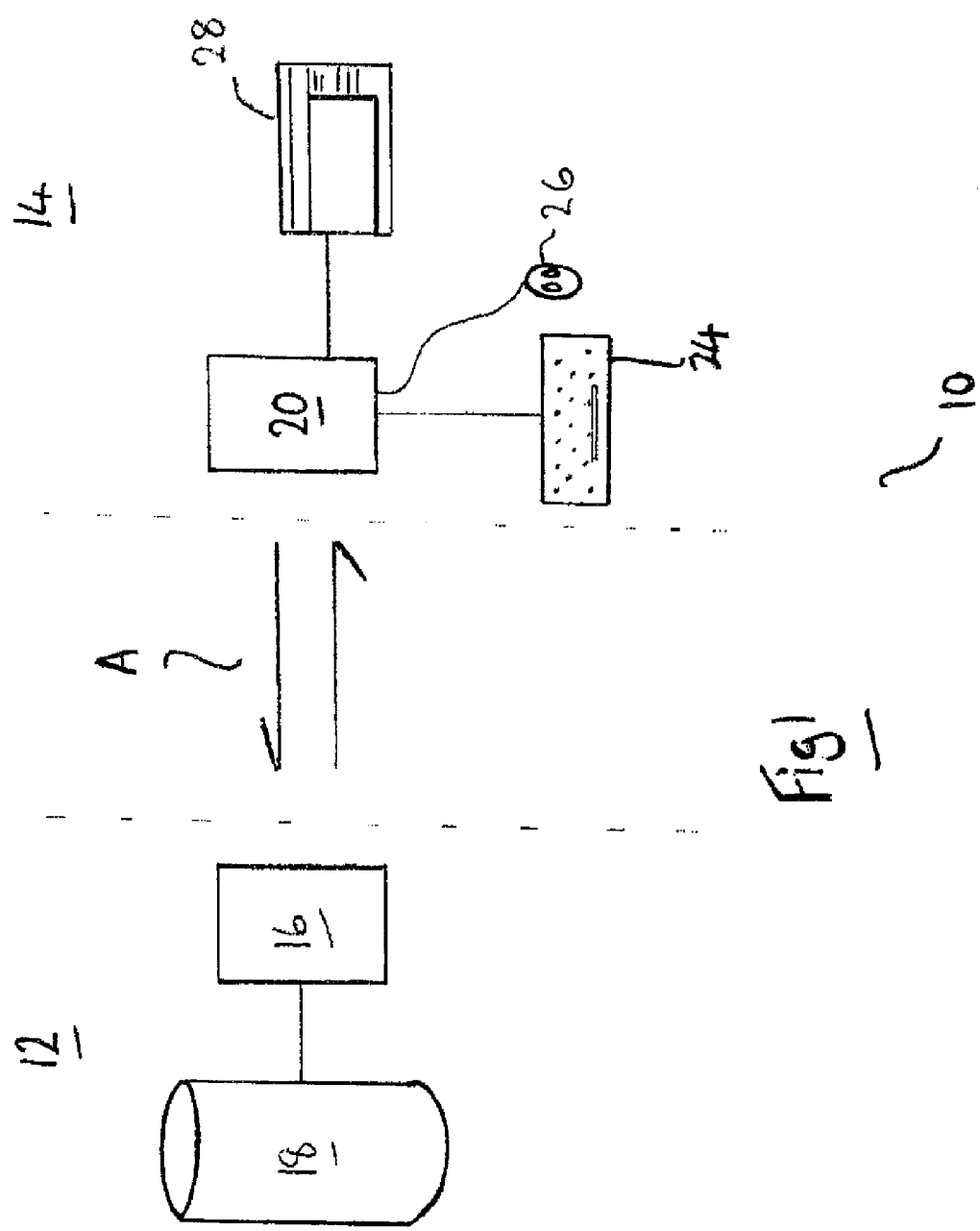

ROOM PLANNING SYSTEM AND METHOD

PRIORITY INFORMATION

The present invention claims priority to PCT Application No. PCT/GB2014/052248 filed Jul. 23, 2014 and UK Patent Application No. 1313112.3 filed Jul. 23, 2013, both of which are incorporated in by reference in their entireties.

BACKGROUND

The present invention relates to apparatus and a method for planning a room, and is concerned particularly, although not exclusively, with apparatus and a method for planning a kitchen.

The process of designing a kitchen includes making selections of several different types of components often from a great many options. Examples of the types of component include structural elements, such as walls, room fixtures, such as doors, floor-standing units, such as drawer units, wall-mounted units, such as cupboards, appliances, such as cookers and refrigerators, and also flooring and lighting.

There are several factors that limit the ways in which such components can be combined. Firstly there is the physical space into which the kitchen must fit. Then there are combinations of components that should not be permitted for aesthetic reasons, or else cannot be accommodated on technical grounds.

Historically, the planning stage involved manually selecting the style and type of component, and then manually determining compatibility, making calculations as necessary. A sketch was produced at the end of the process to visualise the finished design.

More recently the process has become computerised, with a remote central database of components being accessed by local terminals at which a designer specifies items for inclusion in the kitchen and then a remote processor builds a virtual model of the kitchen and sends it back to the local terminal. As well as being able to provide sufficient processing power at a remote server, the accessing of a central database also allows control of stock.

However, such operations are often conducted with the customer present in a store, and the unavoidable delay between sending data and receiving the virtual design is unwanted, particularly when the design had to be amended repeatedly.

The problem of delay becomes more pronounced when the image of the kitchen is to be rendered in 3-D, so that the customer can enjoy a realistic preview of the design.

SUMMARY

Accordingly, the present invention aims to provide an apparatus and method of planning a room, and displaying a virtual representation of a room, in which the abovementioned disadvantages are at least partly overcome.

The present invention is defined in the attached independent claims, to which reference should now be made. Further, preferred features may be found in the sub-claims appended thereto.

According to one aspect of the present invention, there is provided a room-space design system, for enabling a user to design a room-space from a plurality of design options, and for displaying an image of the design, wherein the system comprises a processor, a database, a graphical user interface, a design unit and an image-rendering unit.

In a preferred arrangement the system comprises at least one local processor arranged for communication with a host processor, which host processor may be in communication with the database.

The database may include information relating to one or more design elements for use in the design of the room-space. Preferably the design unit comprises a process arranged to be executed on the local processor. Preferably the image-rendering unit comprises a process arranged to be executed on the local processor.

Preferably the design system is arranged to communicate with a sales system having an estimate, or quote, function and/or an order function. The design system and sales system may be arranged to communicate such that amendments made to a design are automatically made in the sales system.

In a preferred arrangement, the design system is arranged for two-way communication with the sales system. Preferably the design system is also arranged to communicate with a warehousing system, which may include any of a manufacturing, assembly or delivery functions, such that changes in the design system are automatically made in the warehousing system.

The design unit may be arranged to specify a worktop portion having a worktop portion size value (WP), e.g. length, derived from a standard worktop having a standard worktop size value (SW) to leave a remnant having a remnant size value (R), wherein the worktop portion size value and the remnant size value add up to the standard worktop size value, such that when the worktop portion size value is amended the remnant size value is automatically amended. Thus the relationship WP+R=SW may be maintained throughout any amendments.

Preferably the system provides that when further worktop portions are specified from the remnant, such that the further worktop portion size values are WP1, WP2, WP3 and so on, the remnant size value R is automatically amended so that the relationship (WP1+WP2+WP3 . . . )+R=SW.

In a preferred arrangement the system comprises a kitchen space design system. The database may include information relating to any of room fixtures, floor units, wall units, worktops, handles, cornices, plinths, pelmets, sinks, taps, appliances and accessories.

The system may include a display having a first portion which shows the design in a 2-D representation, and a second portion which shows the design in a 3-D representation. In a preferred arrangement, when an amendment is made to the design in the 2-D representation the amendment is made automatically, and preferably substantially in real time, to the 3-D representation.

According to another aspect of the invention there is provided a method of designing a room space, the method comprising selecting design features from a plurality of options, obtaining data of selected design features, displaying a room space template on a graphical user interface and rendering a 3-D image of the room space.

In a preferred arrangement the method includes viewing the design in a real-time walk through image.

The method preferably includes a method of designing a kitchen. The method may include a number of selection steps for selecting features from a group including: room fixtures, floor units, wall units, worktops, handles, cornices, plinths, pelmets, sinks, taps, appliances and accessories.

In a further aspect, the invention provides a computer programme product on a computer readable medium, comprising instructions that, when executed by a computer, cause the computer to perform a method of designing a room space, the method comprising selecting design features from a plurality of options, obtaining data of selected design features, displaying a room space template on a graphical user interface and rendering a 3-D image of the room space.

The invention also comprises a program for causing a device to perform a method according to any statement herein.

The invention may include any combination of the features or limitations referred to herein, except such a combination of features as are mutually exclusive, or mutually inconsistent.

BRIEF DESCRIPTION OF THE DRAWINGS

A preferred embodiment of the present invention will now be described. By way of example only, with reference to the accompanying diagrammatic drawings, in which:

FIG. 1 shows schematically a system for room planning, in accordance with an embodiment of the present invention;

DETAILED DESCRIPTION

Figure 2A:
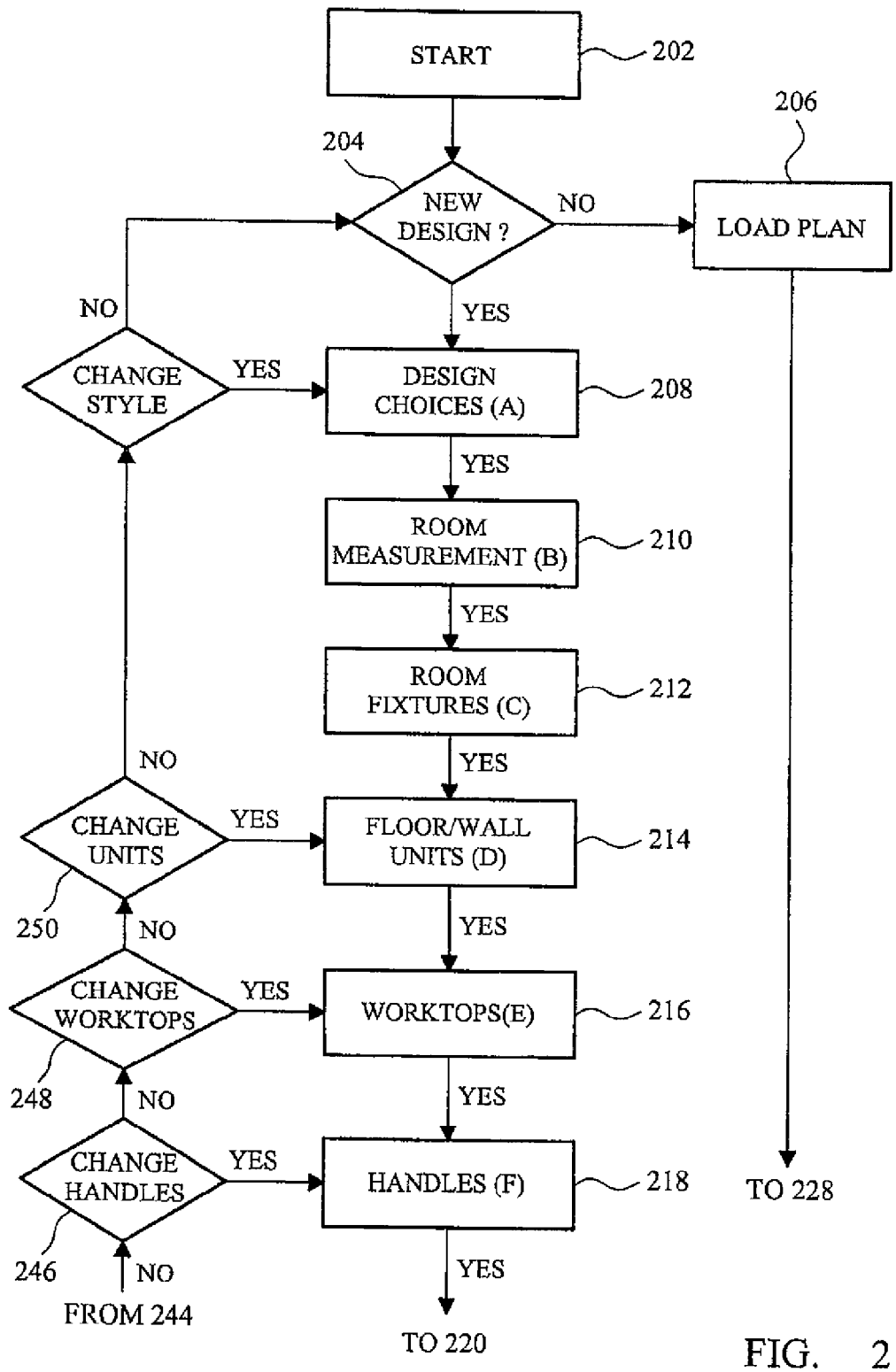
FIGS. 2A and 2B show schematically steps of a room planning method in accordance with an embodiment of the present invention.

The present invention provides a system and method for room planning. A computer terminal, advantageously based in or close to a showroom or sales office, allows a user to create a design of a room space, and then to select from articles to be installed in the room space. The selections are made from a database, which may be located remotely, and regular reference is made to the database to ensure that stock lists are up to date, for example to ensure that items are not specified that are unavailable.

A 3-D engine is used to create the virtual room space and to display it in such a way that the user is able to move throughout the virtual space, and interact with certain of the articles. The 3-D engine is advantageously located in the local computer terminal, in order that the creation and display of the virtual room space can take place without undue delay.

Turning to FIG. 1, this shows schematically a room planning system, generally at 10. The system comprises a host site 12 and a local site 14, two-way communication between which is represented by arrows A. On the host site is a host processor 16, which is connected to a database 18. On the local site is a local processor 20 that is connected to user input apparatus, in the form of a keyboard 24 and mouse 26, and to a graphical user interface, in the form of a display 28.

The database 18 contains data of a plurality of types of product that are available for the design of a room space. In the example of a kitchen room space, the database contains product details of items such as room fixtures, floor units, wall units, worktops, handles, cornices, plinths, pelmets, sinks, taps, appliances and accessories.

The host processor 16 is in communication with one or more local processors 20 via a communications network represented by arrows A, which could be a wide area network, such as the Internet.

The local processor 20, which may comprise a personal computer, has stored thereon a computer programme for causing the processor 20 carry out a room space design method, and for displaying a design template, and an image of the design, on the display 28, as will be described below. A 3-D engine, located within the local processor 20, is able to create and display a virtual room space on the display 28.

Figure 2B:
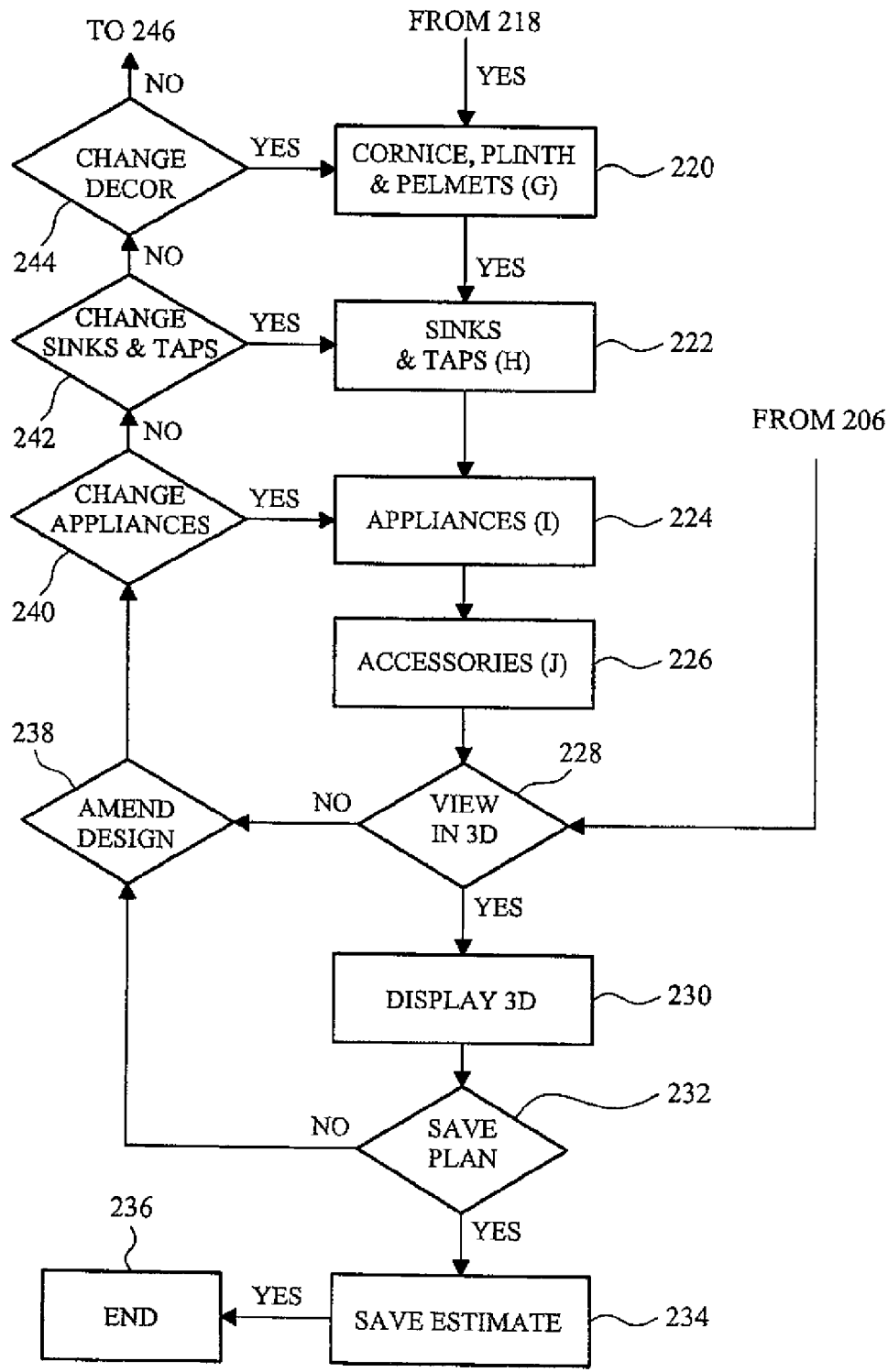

FIGS. 2A and 2B show schematically the major steps in using the room planning system of FIG. 1. The example used in this embodiment is the design of a kitchen.

At a first step 202 the design process starts, with the user opening the system. The user is then prompted at step 204 to choose whether to make a new design, or whether to open a previously stored one. If a previously stored plan is to be retrieved from a memory, this is loaded at step 206. In the alternative, if a new plan is to be commenced, the process moves to the first of the key options at step 208.

At step 208, a decision is made as to the main design choices for the room. This step includes, for example, the selection of a range, and of a cabinet.

With step 208 completed, the process moves on to the selection of room measurements, at step 210. This step is explained in more detail below, with reference to FIG. 3.

Room fixtures are selected at step 212, and this step is described in detail below with reference to FIG. 4.

At step 214 the floor and wall units are chosen. This stage is described in detail below with reference to FIG. 5.

The next decision, at step 216, is the selection of worktop style, as will be explained below with reference to FIG. 6.

At step 218 the handles for the various units are chosen, as will be described below with reference to FIG. 7.

Figure 8:
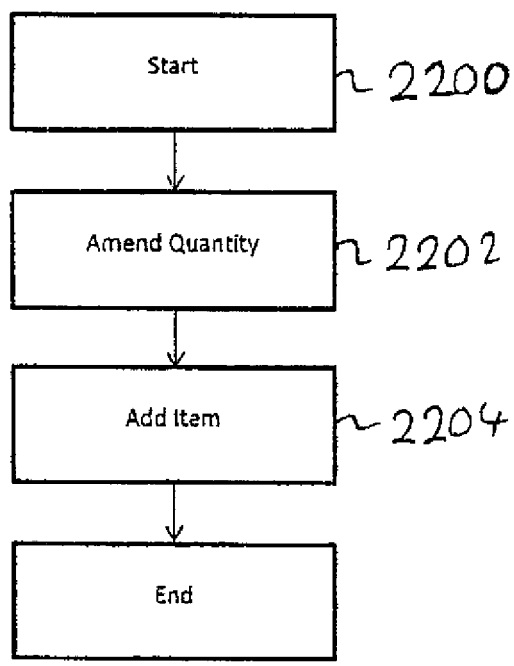

Next, at step 220 the user selects the cornice, plinth and pelmet designs, as will be described with reference to FIG. 8.

Sinks and taps are chosen at step 222, which will be discussed below with reference to FIG. 9.

At step 224 appliances are selected, as will be described below with reference to FIG. 10.

Figure 11:
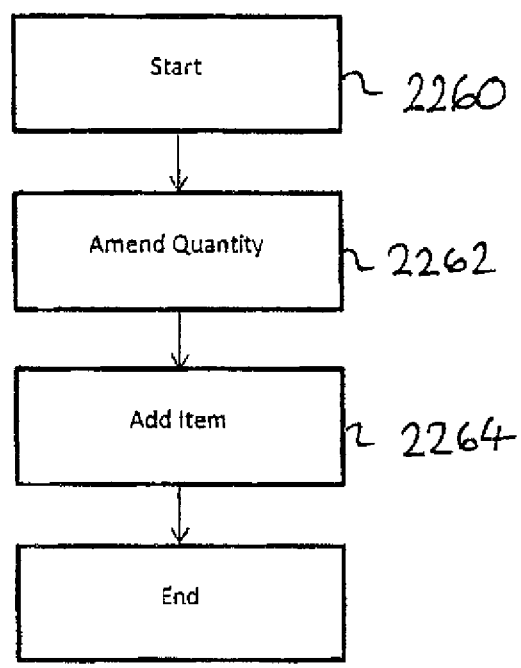

At a final selection step 226, accessories are chosen, as will be described with reference to FIG. 11.

The next stage in the process is to decide whether to view the design as a virtual room, i.e. in 3-D. This is done at step 228. If it is decided to view the virtual room at step 228 then the locally based 3-D engine generates the virtual room and this is displayed at step 230.

A decision is then made at step 232 as to whether the plan should be saved, and if so a cost estimate is generated and saved at step 234. The process ends at step 236.

Going back to step 234, if a decision is made not to save the plan, an amendment phase is started at step 238. This step is also reached if a decision is made at step 228 not to view the virtual room. Once in the amendment phase the user can elect to make changes to the selections made previously at steps, by choosing positively at any of the decision steps 240-250. A basic choice as to whether to change the overall style of room may be made at step 252, and if no amendments are needed the process returns to the step 204, at which the decision may be made whether to start a new design or else to load a plan that has previously been saved (step 206). If the retrieval of a previously saved plan is selected then the decision can be made at step 228 to view the plan in 3-D, i.e. as a virtual room.

In practice, the process is conducted through a window-based interface driven by the local processor 20. The user can change and adapt selections as necessary at any time by navigating a set of menus presented to him on the display 28, so that the detailed decision process need not be such a linear one as is described above.

Figure 3:
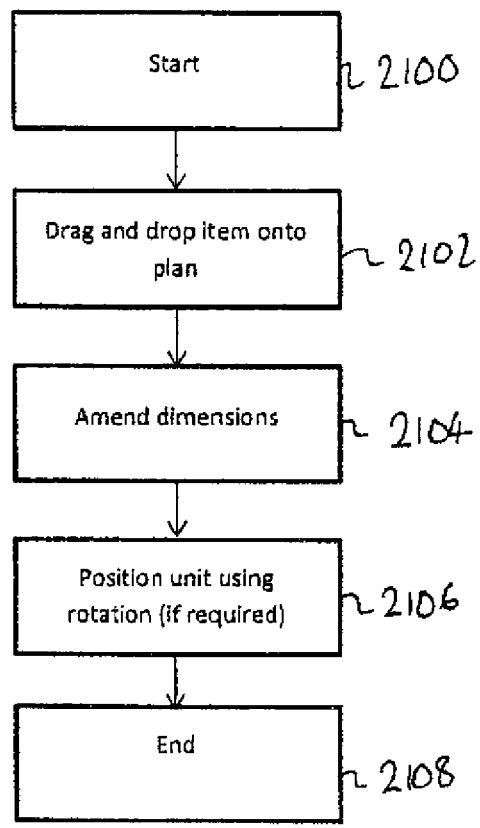
FIGS. 3 to 11 show steps of respective sub processes of the method of FIGS. 2A and 2B.

Turning to FIG. 3, this shows schematically the detailed process for entering room dimensions into the plan, as shown at step 210 of FIG. 2. The design begins with a rectangular room which can be adapted by the user to any shape or set of dimensions (within predefined limits). This approach is more easy to use than some previously considered systems in which a completely blank screen is the starting point, with the user being required to select and position the walls from scratch. A drop down menu allows the user to adapt the shape of the room (step 2102) by selecting individual walls, to assign dimensions (step 2104) to the walls, and to rotate or re-position the walls (step 2106). A drag and drop technique is used to assemble the walls of the room.

When a wall is added, or moved, automated processes ensure that the wall occupies a meaningful position in the room, for example that it attaches to, and does not overlap, another wall.

This, intuitive process, in which angles and lengths are automatically calculated as the user moves an item, is easier to use than previously considered systems. Combinations of mouse buttons and scrolling wheels are used to manipulate the chosen items.

The design is viewable at this stage as a 2-D plan of the room.

Figure 4:
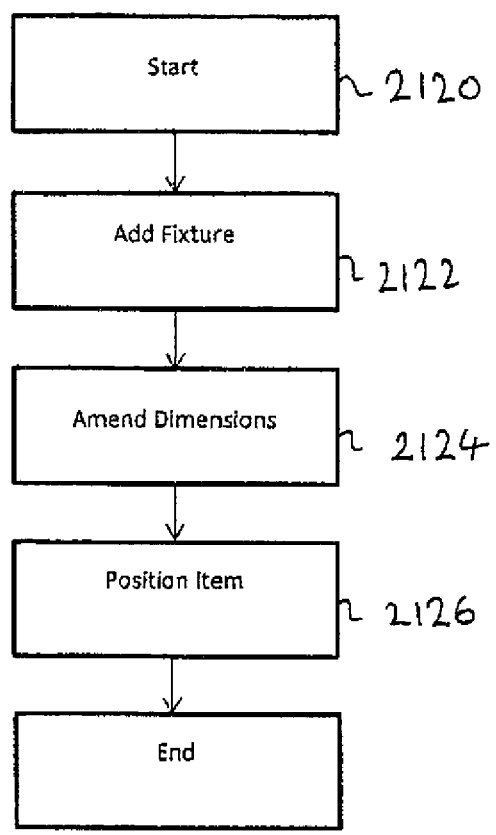

FIG. 4 shows schematically the detailed process of step 212, in which the fixtures of the room are selected. Starting at step 2120 a fixture with standard dimensions is then added at step 2122. An example of such a fixture is a door or a window. The dimensions of the fixture are amended at step 2124 and the position of the fixture may be changed at 2126.

Figure 5:
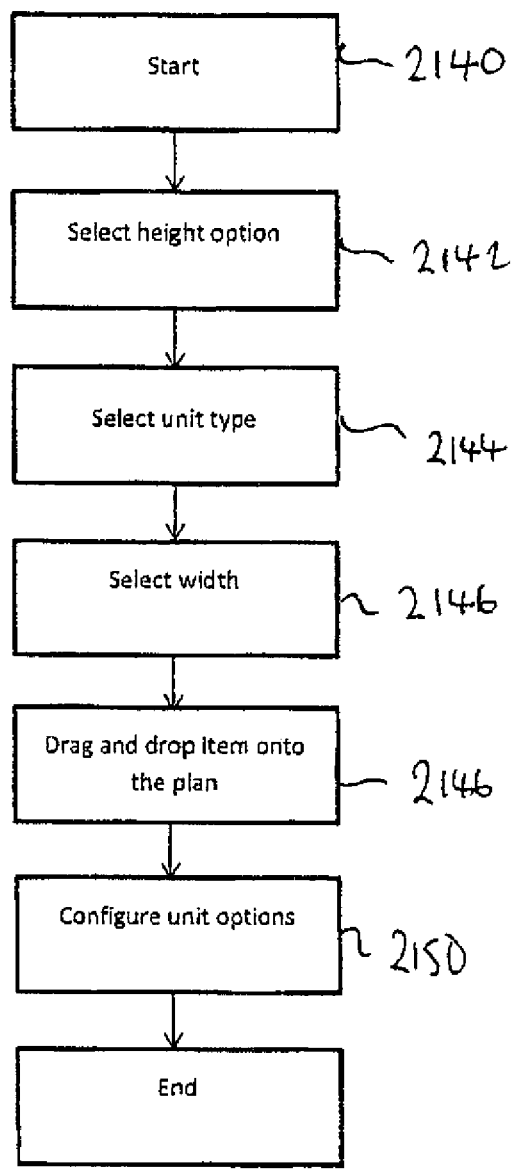

Turning to FIG. 5, this shows schematically the detail of the process at step 214, in which floor and wall units—such as cabinets and cupboards—are selected. Starting at 2140, the height of the unit is chosen at step 2142, then the unit type at step 2144, and the width at step 2146. The unit is then dragged and dropped (step 2148) into position on the 2-D plan, before unit options are configured from a menu specific to the unit at step 2150. Examples of unit options include door or drawer units.

Figure 6:
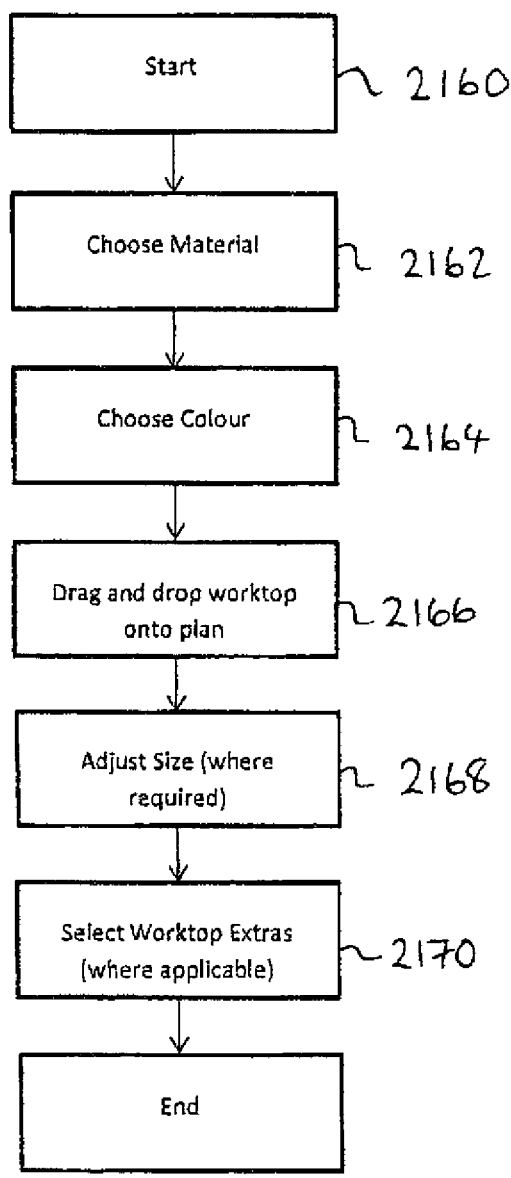

Turning to FIG. 6, this shows schematically the detailed selection process at step 216, in which the worktops are determined. Firstly (at step 2162) the material of the worktop is chosen. At step 2164 the colour is selected and at step 2166 the item is dragged and dropped onto the 2-D plan. The size of the worktop is adjusted as necessary at step 2168 and worktop extras—such as edging band tapes—are selected at step 2170 where applicable.

Figure 7:
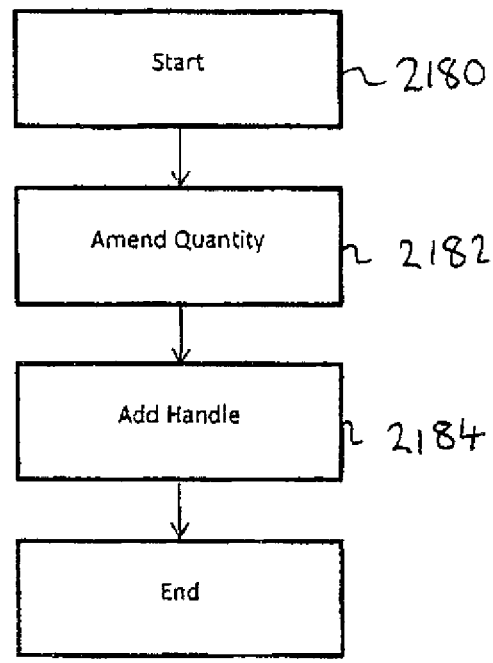

FIG. 7 shows the detail of step 218, in which the number of handles is chosen, according to the various units of the kitchen. At a step 2182 the quantity of handles is amended. At step 2184 one or more extra handles is added. The style and size of the handles is selected automatically according to the range chosen in step 208.

FIG. 3 shows the detailed process of the selection of each cornice, plinth and pelmet in the kitchen, with quantity being selected at step 2202 and items added at step 2204.

Figure 9:
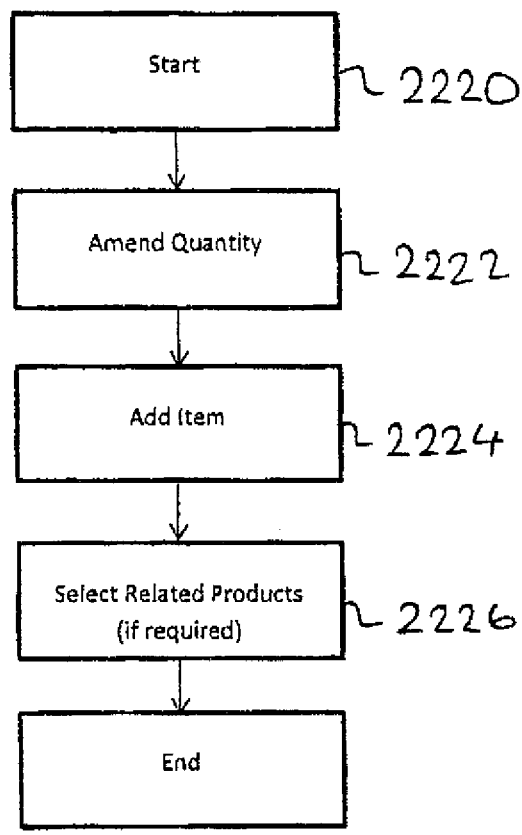

The details of step 222 are shown in FIG. 9, in which the choice of sinks and taps is made. At step 2222 a quantity of sinks and/or taps is amended, and at step 2224 a chosen item is added. Related products are chosen at step 2226.

Figure 10:
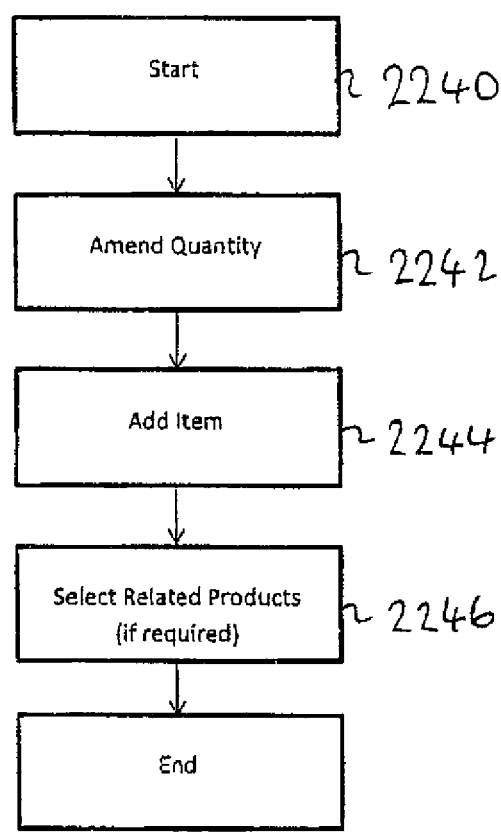

The choice of appliances is made at step 224, and the detailed process is illustrated in FIG. 10, wherein at step 2242 a quantity is amended, at step 2244 a selected item is added. At step 2246 related products are added if desired.

At step 226, accessories, such as decor panels or lighting accessories are chosen. FIG. 11 shows the detailed process, including a step 2262 in which a quantity of accessories is amended, and a step 2264, in which an accessory item is added to the plan.

Each of the detailed processes shown in FIGS. 3-11 is repeatable as necessary, so that the user can add as many of the features as are required during the designing of the room space. In each case the user is presented with a menu of choices and a positioning tool, which in its most basic form is a cursor, but which may include a dimension indication, so that a familiar drag and drop method may be used to add features to the room design.

The local processor 20, on which the design is put together, communicates with the host processor 16 which is connected to the database 18, as previously explained. At each stage of the design process the tool calls the host processor for a product data update, which allows the design process to take into account only what is possible—i.e. which items are actually available for inclusion in the design, and which combinations of items are allowed.

In addition, at every stage when a design choice is made from the great number available, a list of the 3-D data for each selected item, which will be necessary for compiling the virtual room at step 230, is added to. This means that when it is time to create the virtual room, only the 3-D data for the required items must be retrieved from the database. This approach minimises the amount of time required for the 3-D engine to create the virtual room.

The central database can be maintained by a plurality of product managers who may access it from multiple locations. At every call from the local processor, the latest update information is passed on, and suggestions as to new products, as well as warnings of items going out of stock or being withdrawn, can be conveyed to the user.

When the 3-D virtual room is created the user may enter it and may interact with the items, such as opening cupboards and drawers, for example. This provides a customer with a visualisation that is more powerful, and more informative, than a number of individually rendered 3-D images, each of which, in the prior art, are produced at a remote site, often causing considerable delay.

When the customer is happy with the design, the user saves it (step 232) and sales data is automatically accessed to produce an estimate as to the price.

According to an embodiment of the present invention the planner tool is synchronised with a sales function, so that when changes are made to the plan of a room, they are automatically updated in a quote for the design, and in an order for the design, if an order has been placed. In previously considered planning systems no amendment could be made to a plan once an order had been placed without manually updating both the plan and the order. This led to discrepancies between the plan and the order in some cases, when the plan was updated but the order was not. In a preferred embodiment of the present invention the planning tool is locked, or synchronised with the sales function, so that changes that are made to the plan are automatically updated in any quote or order.

Another benefit of this arrangement is that changes are permitted much later in the purchase cycle than had previously been possible. For example, if a change is requested in the planning tool, the system automatically detects whether the change is allowed by the shipping function. If preparations for shipping are not complete then a change will be permitted.

Figure 12:
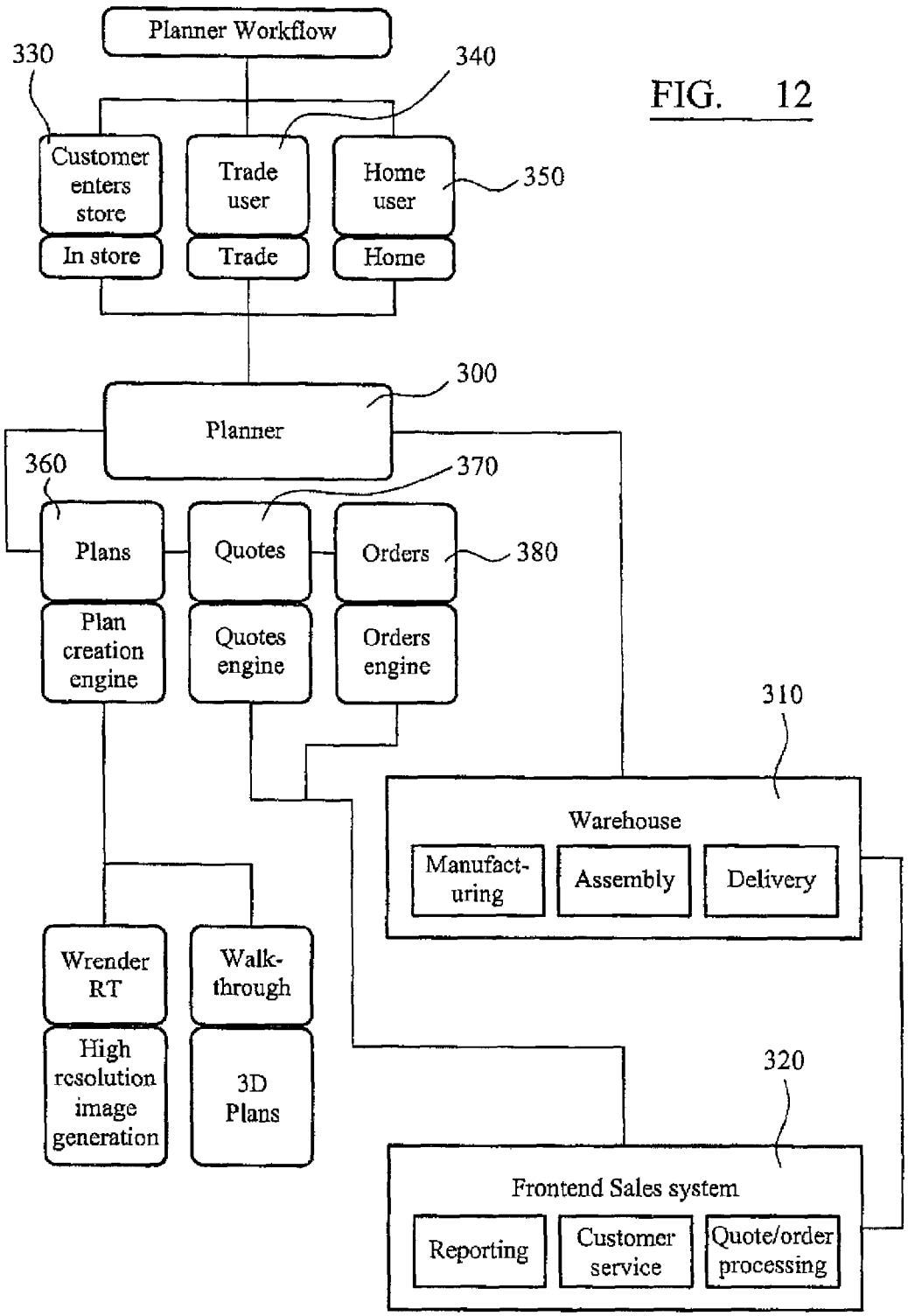
FIG. 12 shows schematically an embodiment of the present invention in which the planner, sales and warehousing functions are linked.

FIG. 12 is a schematic diagram of a system linking the planning function 300, the sales function 310 and a warehouse function 320. The planning workflow begins when either a customer enters a store 330, or else a trade user 340 or home user 350 accesses the planning function 300. A plan is created or amended a Plans Creation engine 360, and if a quote is required this is generated in a Quotes engine 370. If an order is placed this is calculated in an Order engine 380. The planning function is connected to the warehouse 310 and, via the Quote and Order engines, to the sales function 320. The Plans Creation engine also generates representations of the plan that can be viewed by the designer and customer, so that the plan can accurately be visualised. The warehouse function is where the processes of manufacturing, assembly and delivery are managed. This may also be linked directly with the sales function, where reporting, customer service and quote—or order—processing is handled. Synchronising the planning function with the sales and/or warehousing functions allows a quicker, and more accurate updating of a design or plan.

In order to synchronise the different functions a two-way communication is needed between them. To facilitate this, an application programming interface (API) has been written.

A further benefit is that delivery or installation personnel can simply print a copy of the plan immediately prior to delivery, with the confidence that it matches the order information. Furthermore, paperwork, such as packaging and labelling of the items making up the purchased plan, which is generated automatically at the warehouse, can be applied directly to the items for easy identification by the delivery/installation personnel. This reduces the incidence of inaccuracies and speeds up the installation time.

Designers prefer to work in 2-D, for reasons of accuracy. However, customers prefer to visualise the design in 3-D. Previously this meant completing a design in 2-D and then using a processor to render the complete design in 3-D. However, in accordance with embodiments of the present invention the planning tool utilises a split screen display in which both the 2-D and 3-D versions of the plan are presented, and in which they are both updated, substantially in real time as the plan is developed. To do this the planning tool collects the data necessary to visualise items of the design in both 2-D and 3-D, each time an item is selected.

In one embodiment of the present invention it is also possible to render a high-resolution, photo-quality image of the design in 3-D. When the design is finished a high-resolution rendering server runs various scripts for pre-determined lighting and materials, as well as other variables, and returns to the planning tool a photo-quality image.

In the "worktop" part of a kitchen planning process, such as described above with reference to FIG. 6, a further embodiment of the present invention (not shown) has extra functionality for the designer. In particular, the planning tool automatically takes into account tolerances for certain worktops, such as those used on an island or those having two exposed ends. The tool may provide a warning when minimum required tolerances are approached or when an attempt is made to reduce the size of a worktop below a minimum tolerance—which action may be prohibited automatically by the planning tool. In a preferred version, the user is prompted visually to amend the specified worktop so as to comply with tolerances. The tool may also prompt the designer to take account of other stipulated conditions, including regulatory requirements such as are required for compliance with health and safety laws.

Worktops tend to be manufactured according to standard sizes, and when one is notionally cut, as part of the planning process, the planning tool can retain the virtual remnant, or offcut, for use elsewhere in the design. This means that worktops can be used efficiently with minimum waste and therefore minimum cost to a customer. In one embodiment of the present invention (not shown) when a worktop offcut is created it is placed by the planning tool in a virtual bin for use later in the design. Furthermore, when the original portion of the worktop is changed in size, during an amendment to the plan, the tool automatically adjusts the size of the virtual remnant. This is possible because the originally selected worktop remains associated with the offcut, and also any subsequently created offcuts. In accordance with this process a worktop can be virtually divided multiple times and used in various places in the design, whilst each time a change is made the total size value of the remaining worktop is recalculated. This process minimises waste, and also prevents the accidental over-specifying of a remnant. If an attempt is made to use a remnant in a position for which its size (typically length) is insufficient, a visual warning is provided to the user and the action is prohibited by the tool.

In a related embodiment (not shown) an automatic attribution of edge-banding—which is an aesthetic strip of material added to the exposed edge of a worktop and is usually coded to match the worktop in colour and finish—is performed on worktop portions, according to whether the design requires edge-banding. If needed, the required edge-banding is added automatically to the order.

Corner bases are used to fill the gaps that are sometimes created at the corners of a room plan, where units meet. The planning tool can also calculate these automatically and add them to the order, based upon the requirements of the finished design.

Whilst endeavouring in the foregoing specification to draw attention to those features of the invention believed to be of particular importance, it should be understood that the applicant claims protection in respect of any patentable feature or combination of features referred to herein, and/or shown in the drawings, whether or not particular emphasis has been placed thereon.

The invention claimed is:

1. A room-space design system, for enabling a user to design a room-space from a plurality of design options, and for displaying an image of the design, the room-space design system comprising at least one host processor comprising a design unit, and a database in communication with the host processor; at least one local processor comprising an image-rendering unit, a graphical user interface; wherein the local processor is arranged for communication with the host processor and wherein 3-D data associated with objects arranged in the design unit is used to generate a 3-D image of the room-space in the image-rendering unit, wherein the design unit is arranged in use to specify a worktop portion having a worktop portion size value (WP) derived from a standard worktop having a standard worktop size value (SW) to leave a remnant having a remnant size value (R), and wherein the worktop portion size value and the remnant size value add up to the standard worktop size value, such that an amendment to the worktop portion size value is automatically made to the remnant size value.

2. The room-space design system according to claim 1, wherein the database includes information relating to one or more design elements for use in the design of the room-space.

3. The room-space design system according to claim 1, wherein the design unit comprises a process arranged to be executed on the local processor.

4. The room-space design system according to claim 1, wherein the room-space design system is arranged to communicate with a sales system such that amendments made to a design are automatically made in the sales system.

5. The room-space design system according to claim 1, wherein the room-space design system is arranged in use to provide that when further worktop portions are specified from the remnant, such that the further worktop portion size values are WP1, WP2, WP3 and so on, the remnant size value R is automatically amended to maintain the relationship (WP1+WP2+WP3...)+R=SW.

6. The room-space design system according to claim 1, wherein the image-rendering unit comprises a process arranged to be executed on the local processor.

7. The room-space design system according to claim 1, wherein the room-space design system comprises a kitchen space design system.

8. The room-space design system according to claim 7, wherein the database includes information relating to any of room fixtures, floor units, wall units, worktops, handles, cornices, plinths, pelmets, sinks, taps, appliances and accessories.

9. The room-space system according to claim 1, wherein the design unit is arranged in use to provide an edge band sized to fit an exposed edge of the worktop portion.

10. A method of designing a room space, the method comprising selecting design features from a plurality of options, obtaining 3-D data of selected design features, displaying a room space template on a graphical user interface and rendering a 3-D image of the room space based on the 3-D data of the selected design features, wherein the method is arranged in use to specify a worktop portion having a worktop portion size value (WP), derived from a standard worktop having a standard worktop size value (SW) to leave a remnant having a remnant size value (R), and wherein the worktop portion size value and the remnant size value add up to the standard worktop size value, such that an amendment to the worktop portion size value is automatically made to the remnant size value.

11. The method according to claim 10, wherein the method includes viewing the design in a real-time walk through image.

12. The method according to claim 10, wherein the method provides a method of designing a kitchen.

13. The method according to claim 12, wherein the method includes a number of selection steps for selecting features from a group including: room fixtures, floor units, wall units, worktops, handles, cornices, plinths, pelmets, sinks, taps, appliances and accessories.

14. The method according to claim 10, wherein the method is arranged in use to provide that when further worktop portions are specified from the remnant, such that the further worktop portion size values are WP1, WP2, WP3 and so on, the remnant size value R is automatically amended to maintain the relationship (WP1+WP2+Wp3 . . . )+R=SW.

15. A computer program product comprising a non-transitory computer readable storage medium, storing instructions that, when executed by a computer, cause the computer to perform a method of designing a room space, the method comprising selecting design features from a plurality of options, obtaining data of selected design features, displaying a room space template on a graphical user interface and rendering a 3-D image of the room space, wherein the method is arranged in use to specify a worktop portion having a worktop portion size value (WP) derived from a standard worktop having a standard worktop size value (SW) to leave a remnant having a remnant size value (R), and wherein the worktop portion size value and the remnant size value add up to the standard worktop size value, such that an amendment to the worktop portion size value is automatically made to the remnant size value.

16. The computer program product comprising the non-transitory computer readable storage medium according to claim 15, wherein the method is arranged in use to provide that when further worktop portions are specified from the remnant, such that the further worktop portion size values are WP1, WP2, WP3 and so on, the remnant size value R is automatically amended to maintain the relationship (WP1+WP2+WP3 . . . )+R=SW.

* * * * *